(12) United States Patent
Nagel et al.

(10) Patent No.: US 9,088,801 B2
(45) Date of Patent: Jul. 21, 2015

(54) METHOD FOR IDENTIFYING IMPROPER TRANSMISSION OF IMAGES IN AN IMAGE-PROCESSING DEVICE AND A CORRESPONDING IMAGE-PROCESSING DEVICE

(71) Applicants: Uwe Nagel, Karlsruhe (DE); Klaus Burkhardt, Kraichtal (DE); Andreas Kärcher, Weingarten (DE)

(72) Inventors: Uwe Nagel, Karlsruhe (DE); Klaus Burkhardt, Kraichtal (DE); Andreas Kärcher, Weingarten (DE)

(73) Assignee: EIZO GMBH (DE)

( * ) Notice: Subject to any disclaimer, the term of this patent is extended or adjusted under 35 U.S.C. 154(b) by 135 days.

(21) Appl. No.: 13/668,643

(22) Filed: Nov. 5, 2012

(65) Prior Publication Data

US 2013/0113954 A1    May 9, 2013

(30) Foreign Application Priority Data

Nov. 4, 2011 (DE) .......................... 10 2011 117 659

(51) Int. Cl.
*H04N 17/00* (2006.01)
*H04N 5/222* (2006.01)
*H04N 19/89* (2014.01)

(52) U.S. Cl.
CPC ..................................... *H04N 19/89* (2014.11)

(58) Field of Classification Search
CPC .......... H04N 5/23293; H04N 2101/00; H04N 5/232; H04N 1/2112; H04N 5/2251
USPC ......................................... 348/222.1, 333.01
See application file for complete search history.

(56) References Cited

U.S. PATENT DOCUMENTS

2008/0267516 A1*  10/2008  Chang et al. .................. 382/236

FOREIGN PATENT DOCUMENTS

| DE | 102 08 234 A1 | 12/2002 |
| DE | 10 2007 041 719 A1 | 5/2008 |
| EP | 0 597 616 A1 | 5/1994 |
| EP | 1 119 202 A2 | 7/2001 |
| EP | 2 282 428 A1 | 2/2011 |

* cited by examiner

*Primary Examiner* — Tuan Ho
*Assistant Examiner* — Selam Gebriel
(74) *Attorney, Agent, or Firm* — Ostrolenk Faber LLP

(57) ABSTRACT

The invention pertains to a method for operating an image-processing device, in which an image signal is digitally transmitted between a transmitter and at least one receiver, and in which the image signal comprises a timed sequence of images. An alternating signal which alternates at a signal alternation frequency is superimposed on the image content of the images before they are transmitted, and the signal alternation frequency is greater than or equal to the perception frequency resolvable by the human eye. The invention also pertains to an image-processing device.

15 Claims, 2 Drawing Sheets

METHOD FOR IDENTIFYING IMPROPER TRANSMISSION OF IMAGES IN AN IMAGE-PROCESSING DEVICE AND A CORRESPONDING IMAGE-PROCESSING DEVICE

CROSS REFERENCE TO RELATED APPLICATION

The present application claims priority of German Patent Application No. 10 2011 117 659.8, filed Nov. 4, 2011, the entire contents of which are hereby incorporated by reference.

FIELD OF INVENTION

The invention pertains to a method for operating an image-processing device, in which an image signal is digitally transmitted between a transmitter and at least one receiver, and in which the image signal comprises a timed sequence of images. The invention also pertains to an image-processing device.

BACKGROUND OF THE INVENTION

Methods of the type indicated above are known from the prior art. They are used for the operation of the image-processing device, which handles the transmission of the image signal between the transmitter and the receiver. The transmitter is connected to, for example, a recording device or a data-acquisition device, by means of which the image signal is acquired. The image signal consists of a timed sequence of images, which contain the image content recorded by the recording device.

The transmission between the transmitter and the receiver proceeds in an exclusively digital manner, wherein compression can be carried out if desired. If the image signal is compressed before transmission, preferably a loss-free compression method is used. Alternatively, however, a lossy compression method could also be used. The transmission takes place preferably over a transmission route consisting of a shielded cable or comprising an optical fiber. It is obvious, however, that the transmission route can be designed in any suitable way.

When the image signal is transmitted in analog form, any problem with the transmission route has a visible effect on the transmission quality, so that, when the image signal displayed on the display device is observed, an essentially reliable judgment can be made about whether or not the image transmission process has been successful or faulty. When the images are transmitted in digital form, however, the problem can occur that, even though the transmission route is severely compromised, the images can still be displayed in a manner which appears qualitatively unimpaired, such as when, for example, one of the successive images is repeated. This is the case especially when an image buffer is assigned to the receiver, from which one of the most recent successfully transmitted images can be reproduced again. When this happens, a static or "frozen" image results, which does not represent the current image content.

The method indicated above is used in particular for imaging systems in the medical area. In these systems, it is very important to know whether or not the image being shown at any particular moment on the display device is current, that is, whether it comprises the current image content acquired by the recording device, or whether the image reproduction chain has frozen as a result of, for example, a fault in the image transmission process. If, for example, a patient is being treated on the basis of the displayed image, and if the person performing the treatment assumes that the displayed image is current whereas in fact it is frozen and no longer current, the consequences can be serious, and in particular the patient can suffer injury.

SUMMARY OF THE INVENTION

It is therefore the goal of the invention to propose a method for operating an image-processing device, which does not suffer from the disadvantages cited above but which instead makes it possible in particular to recognize reliably when image transmission is successful and when faulty and thus to recognize a frozen image.

According to the present invention, before the transmission, an alternating signal, which alternates at a certain signal alternation frequency, is superimposed on the image content of the images, and that the signal alternation frequency is greater than or equal to the perception frequency resolvable by the human eye. The image signal is transmitted digitally from the transmitter over the transmission route to the receiver. Before that, the alternating signal is superimposed on the image content of the images. This is done preferably upstream of the image buffer, if such a buffer is provided in the transmission chain; it is done at least, however, prior to the transmission. The transmitted image consists to this extent of the image content and the alternating signal or a component of the alternating signal. The alternating signal ensures that successive images differ from each other. This difference can be determined automatically, for example; in particular, it can be determined in the receiver or in the display device.

Thus, if a difference is present between successive images of the image signal, it is possible to conclude that signal transmission over the transmission route has occurred successfully. The determination of the difference is done, for example, by means of an automatic comparison of at least two successive images, in particular of two immediately successive images, of the image signal, at least certain areas of these images being compared to each other. The comparison can be advantageously extended to more than two successive images, as a result of which the risk of an incorrect determination of successful or faulty image transmission is reduced and the accuracy of such determinations is increased. Accordingly, at least three or more successive images are compared to each other.

Alternatively, the recognition of successful or faulty image transmission can be left to the user of the image-processing device, in particular to the user of the receiver or of the display device. Because the alternating signal alternates at a signal alternation frequency which is greater than or equal to the perception frequency resolvable by the human eye (approximately 20 Hz), the user cannot separate the individual component signals of the alternating signal from each other when image transmission is successful. They appear to him instead as superimposed components signals. The signal alternation frequency is preferably considerably greater than the perception frequency, especially a multiple of that frequency. The individual component signals of the alternating signal differ with respect to, for example, their color appearance and/or their pattern. If an error now occurs in the image transmission, if, for example, the image has frozen, the user perceives only one of the component signals of which the alternating signal is composed.

The user can to this extent easily determine whether the images have been transmitted successfully or not. An especially important aspect here is that the signal alternation frequency is greater than or equal to the perception frequency. Only this makes it possible to ensure that, during the operation of the image-processing device, the images on the display device will not flicker in a manner annoying to the user and that instead the images will always be stable. If the signal alternation frequency is lower than the perception frequency, the user will be able to distinguish the individual component signals. He will therefore be constantly distracted from the actual image content of the image. He will be forced to evaluate the visible component signals and to decide whether image transmission is successful or faulty. When the inventive approach is used, however, the individual component signals of the alternating signal are always superimposed on themselves under conditions of successful image transmission in such a way that the alternating signal always presents a constant and stable visual impression. The user is to this extent not distracted from the actual image content of the image which has been transmitted and displayed.

Especially in the medical field it can occur that two successive images, especially immediately successive images, have the same image content, perhaps because the scene recorded by the recording device has not changed. A case such as this occurs frequently, for example, when images are recorded during an angiography without a contrast agent or in the case of x-ray imaging. Without the superimposition of the alternating signal, it is impossible under certain conditions to see any difference between the successive images of the image signal if the scene has not changed, which means that the user cannot be sure whether the images have been transmitted successfully or not.

For this reason, it is especially important in the inventive method for the alternating signal to be superimposed on the image content before the images are transmitted. In this case, the successive images will be different after transmission even if their image content is identical. When successive images are compared, therefore, it will be possible to see a difference; that is, the observer can determine whether the component signals of the alternating signal are displayed superimposed on each other or separately from each other and therefore conclude that the image transmission is successful or faulty.

According to an elaboration of the invention, the images are shown by a display device at a display frequency which is greater than or equal to the signal alternation frequency. The display device serves to display the successive images of the image signal. The images are displayed at the display frequency, which means that the images of the image signal follow each other at a time interval equal to the inverse of the display frequency. In particular, so that the user himself will be able to recognize when the images are being transmitted successfully or not, it must be ensured that the individual component signals of the alternating signal appear on the display device. For this reason, the display frequency is greater than or equal to the signal alternation frequency. The display frequency and the signal alternation frequency are preferably the same. Thus each component signal of the alternating signal appears during a uniform, constant segment of display time. None of the individual component signals is therefore "swallowed", which would result in a nonuniform appearance of the alternating signal on the display device, which would be perceived as, for example, a flickering of the superimposed display of the component signals of the alternating signal.

According to elaboration of the invention, the superimposition is carried out in a recording device during or immediately after the recording of the image content and/or before the digital transmission. In principle, it does not matter where in the image transmission chain the alternating signal is superimposed on the image signal. What is important is only that this is done before the digital transmission of the images. It is especially advantageous for the alternating signal to be superimposed on the image signal while the image content is being recorded or immediately thereafter. This ensures that a reliable conclusion can be drawn about a possible fault in image transmission which may occur anywhere in the entire image transmission chain, extending from the recording device to the receiver or display device.

According to an elaboration of the invention, each image and the associated image content comprise numerous pixels, each with at least one image pixel value, and the alternating signal affects the pixels in a modification area of the image. Each image and corresponding the associated image content also are composed of multiple pixels organized basically in any way desired (for example, in rows and columns), wherein each pixel comprises at least one pixel value. As a function of the color space being used, the image pixel value specifies the color and/or the intensity with which the pixel is displayed when shown on the display device.

The number of pixel values which must be provided differs as a function of the color depth of the image signal, i.e., of the images contained therein. A monochrome image, especially a black-and-white image or a gray-scale image, usually comprises only one pixel value per pixel, wherein the pixel value can, however, have different resolutions. In the case of a black-and-white image, for example, a resolution of one bit per image value is sufficient (the color depth of the image signal is therefore 1 bit), whereas the pixel value of a gray-scale image has a resolution of greater than or equal to 8 bits and can be in particular 10, 12, or 16 bits. The pixel value for the gray-scale image specifies the intensity with which the corresponding pixel is reproduced on the display device. If the image is in color, several pixel values are assigned to each pixel; these values can again have different resolutions. For example, at least three pixel values are provided, this again depending on the color space being used, and each of these values has a resolution of at least 8 bits, of 10, 12, or 16 bits, to describe the intensities of the three basic colors red, green, and blue to be displayed.

The modification area of the image comprises at least one of the pixels, preferably several pixels. The alternating signal is superimposed on these pixels, i.e., those which are assigned to the modification area. Thus the image signal, i.e., the associated image content of the corresponding image, is affected by the alternating signal only in the modification area, not outside this area.

According to an elaboration of the invention, the alternating signal comprises at least two different alternating component signals; each component signal consists of at least one pixel; and the pixel value of the pixel is imposed on the corresponding pixel value of the image content by addition, or it overwrites and thus replaces it. Like the image and the image content, the component signals of the alternating signal consist of the at least one pixel, preferably, however, of several pixels. Each pixel of the component signals is assigned to a pixel of the image or image content. When the alternating signal is superimposed on the image signal, the pixel value of the pixel of the component signal is either imposed on the corresponding pixel value of the pixel of the image content or replaces the latter. In the case of an imposition, therefore, the pixel value of the component signal is added to the pixel value of the image content. The result of this addition forms the pixel value of the corresponding pixel of the resulting image. Alternatively, the original pixel of the image content can also be replaced by being overwritten by the pixel value of the component signal. The pixel value of the resulting image accordingly corresponds to the pixel value of the component signal and not—as is the case outside the modification area—to the pixel value of the image content. Whereas, in the case of the former procedure, the original image content remains at least partially preserved and is merely distorted, it is completely replaced when overwritten, so that now—in the modification area—only the pixel value of the component signal is present.

According to an elaboration of the invention, when the alternating signal is superimposed on the image signal, at least one bit of a pixel value, preferably of all pixel values in the modification area, are set to a certain value for the first of the successive images and set to a certain second value for the second image. The at least one bit, in particular only a single bit, of the corresponding pixel or of the corresponding pixels is therefore replaced by that of the alternating signal or of the associated component signal. For example, all of the bits, that is, the entire pixel value, is replaced. Thus the corresponding pixel or the corresponding pixels is/are replaced by those of the alternating signal or of the associated component signal. The pixel values of the component signal assigned to the first image, accordingly, comprise the first value, and those of the component signal assigned to the second image comprise the second value. Thus component signals with the first value alternate in the alternating signal with component signals with the second value. Of course, it is also possible to provide a larger number of component signals and pixel values, so that, for example, the pixel value for a third image would be set to a certain third pixel value. This series can be continued as long as desired.

What we have in the case of the superimposition of the alternating signal on the image signal is to this extent a case of the previously described "overwriting". The pixel values of the image signal are, accordingly, completely replaced by the pixel values of the assigned component signal. In particular, the images follow each other immediately; that is, there are no intermediate images between the first and second ones.

It is especially advantageous in this embodiment for the pixels surrounding the modification area—which form a background area for the alternating signal—to comprise a pixel value which produces the same or at least a similar color impression on the user as the component signals with the signal alternation frequency superimposed on the image content. For example, these pixels should comprise a pixel value which corresponds to an average value of the certain first value and the certain second value. If the image signal is being transmitted without error, the user has the impression of an essentially monochrome area. If, however, an error occurs, he then recognizes either the first or the second component signal, which differ from the surrounding background area. The background area can be separate from the modification area or alternatively be a part of it, that is, superimposed together with it on the image content.

According to an elaboration of the invention, all of the bits of the pixel value in question are set, and the first value is a maximum value, the second a minimum value of the pixel value. Accordingly, what is done is that the entire pixel value is set or replaced. As explained above, the pixel values can have different resolutions. The first value should correspond to the maximum value, i.e., to the maximum value which the pixel value can assume. Correspondingly, the second value should give the minimum value, i.e., the smallest possible value which the pixel value can have. The minimum value will usually be equal to 0, the maximum value equal to 2n−1, where n describes the color depth of the image, that is, the resolution of the pixel value. For a color depth of, for example, 8 bits, the minimum value is 0 and the maximum value is 255.

According to an elaboration of the invention, the bit is the smallest bit of the associated pixel value. Each pixel value is coded in the binary system and accordingly the number of bits which it has corresponds to the color depth. The smallest bit (also called the "least significant bit" or "lsb") is the bit which, when changed, causes the least change in the pixel value, usually by an amount of 1. A change in the least significant bit usually leads to only a slight, invisible or barely visible change in the image content when it is reproduced on the display device. Accordingly, if the decision is made to change only the least significant bit explained here, it would also be possible to select a signal alternation frequency which is lower than the perception frequency. It would therefore not be necessary for the signal alternation frequency to be greater than or equal to the perception frequency. Because the change is so slight when displayed, it is usually possible to recognize faulty or successful image transmission only with the help of an automatic evaluation of the successive images by comparison. The user, however, cannot or can hardly perceive the changes and to this extent cannot reliably determine whether image transmission has been successful or faulty. To this extent what we have here is a digital "watermark", which the user cannot evaluate directly but which makes it possible for status of image transmission to be evaluated automatically.

According to an elaboration of the invention, the first and the second value are selected in such a way that, when the bit is set, a certain parity of the pixel value is obtained, in particular a parity which differs between the first and the second successive image. First, therefore—under consideration of all the bits—the parity of the pixel value in question is determined. Then the at least one bit is set in such a way that the desired parity is obtained. Preferably only a single bit, in particular the least significant bit, is set to the first or second value. So that successful or faulty image transmission can be recognized after transmission, the parity of the successive images is then determined and evaluated, preferably just before the images are displayed.

For example, the values can be selected in such a way that the parity always remains the same despite different image contents. Preferably, however, the parity for each of the images—preferably images which follow each other immediately—is different. This means, for example, that the pixel value for the first image is even, for the second image odd, for the image immediately following this even again—and so on. Because of the alternating parity, it is possible to determine reliably after the transmission whether image transmission has been faulty or successful.

According to an elaboration of the invention, when the alternating signal is superimposed on the image signal for a first of the successive images of the image signal, at least one pixel value and preferably all of the pixel values in the modification area are increased by a certain value, whereas, for the second image, the one or all pixel vales are decreased by the same value. The corresponding pixels are therefore modified by the pixels of the alternating signal, i.e., of the associated component signal. For example, the pixel values of the component signal in question are added to the associated pixel values of the image content, from which the final pixel value of the image results. The pixel values of the component signal assigned to the first image are in particular positive and comprise the certain value or—if several pixel values are modified—certain values, in particular different ones. The pixel values of the component signal assigned to the second image, conversely, are negative, but have the same certain value in the absolute sense or the same certain, in particular different, values in the absolute sense. The images in particular follow each other immediately; there are therefore no intermediate images between the first and second.

The component signals with the positive and negative values alternate and are impressed, in order, on the image content of the associated image of the image signal. To this extent what we have is the previously described addition of the pixel values of the component signal to those of the image content, this addition resulting in the pixel value of the image pixel in question. In this way, it is possible in particular to introduce a complementarity symbol into the images of the image signal, wherein the complementarity symbol is impressed positively in the first image and negatively in the second. When the image signal is shown on the display device in the presence of a signal alternation frequency which is greater than or equal to the perception frequency, the alternating signal essentially averages out under observation by the user, so that very little if any change versus the original image content can be seen. When faulty image transmission or a frozen image occurs, however, it will always be the same component signal of the alternating signal which is displayed, which means that the complementarity sign in either the positive or negative form can be seen on the display device. These symbols are easy for the user to distinguish from the image content, which means that he can reliably determine when image transmission is faulty.

According to an elaboration of the invention, the certain value is decreased when increasing and/or decreasing it leads to an overrun of the pixel value, or it is increased to a certain maximum value if no overrun is present. The certain value or the certain values of the component signals of the alternating signal are adjusted adaptively to the image content of the images of the image signal. An "overrun" is understood to mean that the superimposition of the pixel value of the component signal in question on the pixel value of the image content leads to a departure from the value range of the resulting pixel value, i.e. to a situation in which the resulting pixel value is no longer within its normal range. This can occur when, for example, the maximum value is exceeded or the minimum value is undershot. If such an overrun occurs, the first possibility is to set the upper limit for the pixel value to the maximum value and the lower limit to the minimum value in order to avoid significant falsifications of the image content. This approach, however, leads to the situation that, even when the images are displayed at sufficiently high frequencies, the successive component signals cannot cancel each other out, so that at least a weakened display of the alternating signal can become visible on the display device.

For this reason, it can be provided, additionally or alternatively, that, on the occurrence of the overrun, the certain value is decreased, so that only the decreased certain value is superimposed on the pixel value of following image contents. This decrease is usually to be understood in the absolute sense, so that a positive pixel value is decreased but a negative one is increased. The decrease is carried out for successive images until no more overruns occur. In addition or as an alternative, it can also be provided that the certain value is increased, in particular to the certain maximum value, when no overrun is occurs. In this way, it can be ensured that, as a function of the current image content, it will always be possible to recognize faulty image transmission as effectively as possible. If the component signals of the alternating signal comprise several different certain values, because, for example, the component signals contain a gray-scale image or a color image, it is possible in cases where the overrun involves only one of the pixel values to decrease all of the certain values proportionally. The corresponding approach can be provided when the certain values are to be increased.

According to an elaboration of the invention, the images of the image signal follow each other at a certain frame-change frequency, and this frame-change frequency is greater than or equal to the signal alternation frequency. Ideally, the frame-change frequency is the same as the display frequency. It can also be lower than that, however, which means that, when the image signal is being displayed by the display device, individual images of the image signal are repeated to make display at the display frequency possible, which is higher here than the frame-change frequency. It is provided, however, that the frame-change frequency can be greater than or equal to the signal alternation frequency to ensure that each of the successive component signals of the alternating signal can be assigned to at least one image of the image signal. This prevents individual component signals of the alternating signal from being ignored; that is, it prevents them from not being assigned to an image. It is especially preferred for the frame-change frequency, the signal alternation frequency, the display frequency, and the image transmission frequency to be the same.

According to an elaboration of the invention, the image comprises a useful area, which is displayed when the image is shown on the display device; an edge area, which is outside the useful area but which is also displayed; and an outside area, which is not displayed. The certain modification area lies in the useful area, in the edge area, and/or in the outside area. The image thus comprises three different areas. The useful area is usually the one in which the image content relevant to the user is shown. The edge area can be used to show status information, for example, such as information on the occurrence of good or faulty image transmission, or to serve as background for a logo. The outside area, finally, is not displayed on the display device. It lies outside the edge area, which for its own part surrounds the useful area and is therefore outside it.

The outside area is nevertheless transmitted by the transmitter to the receiver. Accordingly, it can be used to transmit useful information such as synchronization data between the transmitter and the receiver. The modification area, in which the alternating signal affects the pixels, can be provided in any of these three areas; in particular, it can also overlap several of the areas. When it is the user who is responsible for recognizing faulty image transmission, the modification area lies in particular at least partially in the useful area and/or the edge area. When successful or faulty image transmission is determined automatically, the modification area can also be present in the outside area or be located exclusively in it.

According to an elaboration of the invention, the alternating signal comprises a symbol, in particular a pictogram or a character. The symbol is to this extent a carrier of meaning, which symbolizes, for example, successful or faulty image transmission to the user. The symbol can, for example, be in the form of a pictogram or a character. The former is to be understood as an individual symbol, which conveys information by simplified graphic means. For example, especially when the modification area is in the outside area, a vertical bar can be used as a pictogram for a first component signal of the alternating signal, and a horizontal bar can be used for a second component signal of the alternating signal. When the two component signals, which are impressed on the associated images of the image signal at a signal alternation frequency which is greater than or equal to the perception frequency, are displayed alternately, the user will see a plus sign when image transmission is successful, whereas, when image transmission is faulty, he will see a minus sign or the vertical bar. The user can thus clearly derive from the meaning of the pictogram whether image transmission is occurring properly or not. Alternatively, the symbol can be a character such as a letter or the like.

The invention also pertains to an image-processing device, especially for implementing the method described above, wherein the image-processing device has a transmitter and at least one receiver, which are designed for the digital transmission of an image signal, which comprises a timed sequence of images. It is provided that the image-processing device is designed to superimpose an alternating signal, which alternates at a signal alternation frequency, on the image content of the images before they are transmitted, wherein the signal alternation frequency is greater than or equal to the perception frequency resolvable by the human eye. The digital transmission occurs between the transmitter and the at least one receiver. The image-processing device can be elaborated according to the embodiments described above.

The invention is explained in greater detail in the following on the basis of the exemplary embodiments illustrated in the drawings, which are not intended to impose any limitation on the invention:

Other features and advantages of the present invention will become apparent from the following description of the invention which refers to the accompanying drawings.

BRIEF DESCRIPTION OF THE FIGURES

FIG. 3 is a schematic diagram of the image signal for a second embodiment of the invention.

DETAILED DESCRIPTION OF EMBODIMENTS OF THE INVENTION

Figure 1:
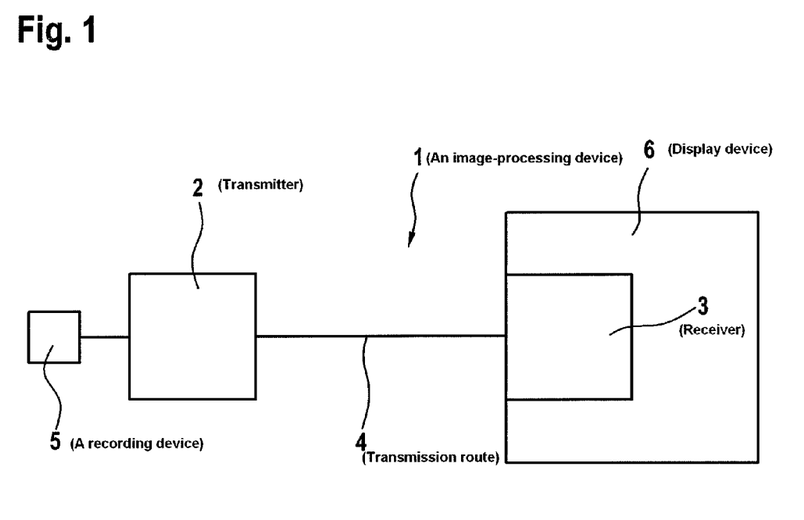
FIG. 1 is a schematic diagram of an image-processing device for digitally transmitting an image signal consisting of a timed sequence of images.

FIG. 1 shows an image-processing device 1. Among other components, the image-processing device 1 consists of a transmitter 2 and a receiver 3. These are connected to each other by a transmission route 4, usually a shielded cable, and are set up for the digital transmission of an image signal. A recording device 5 of the image-processing device 1 is connected to the transmitter 2. Alternatively, the transmitter 2 can be designed as an integral part of the recording device 5. The latter serves to record a scene and to generate images in an image sequence at a certain recording frequency, which it supplies as an input signal to the transmitter 2. The transmitter 2 accepts the input signal as an image signal, or—if the signal is in analog form—the transmitter digitizes it into the image signal. The receiver 3 is integrated into a display device 6. This eliminates the need for an additional external cable to transmit the image signal from the one to the other. The images of the image signal are transmitted between the transmitter 2 and the receiver 3 at a transmission frequency which is expressed in images per unit time. The display device 6 reproduces the transmitted images at a display frequency which is preferably the same as the transmission frequency. Both the transmitter 2 and the receiver 3 usually have their own digital image buffers (not shown here).

The transmitter 2 and/or the recording device 5 can comprise means for image processing. These can, for example, modify at least one of the images as soon as it has been recorded or before it has been transmitted over the transmission route 4. Preferably all of the recorded or transmitted images are modified. For example, the processing means can be used to adjust the contrast of the image content of the images and/or to adjust the color depth. The latter option is used in particular in cases where the images of the image sequence are recorded at a considerable color depth of, for example, 16 bits, whereas the images are displayed at a lower color depth of only 8 bits, for example. To reduce the amount of data to be transmitted, it is therefore provided that, immediately after the recording or at least prior to transmission, the color depth is reduced by the image-processing means. In principle, however, the images can be modified in any desired way.

Figure 2:
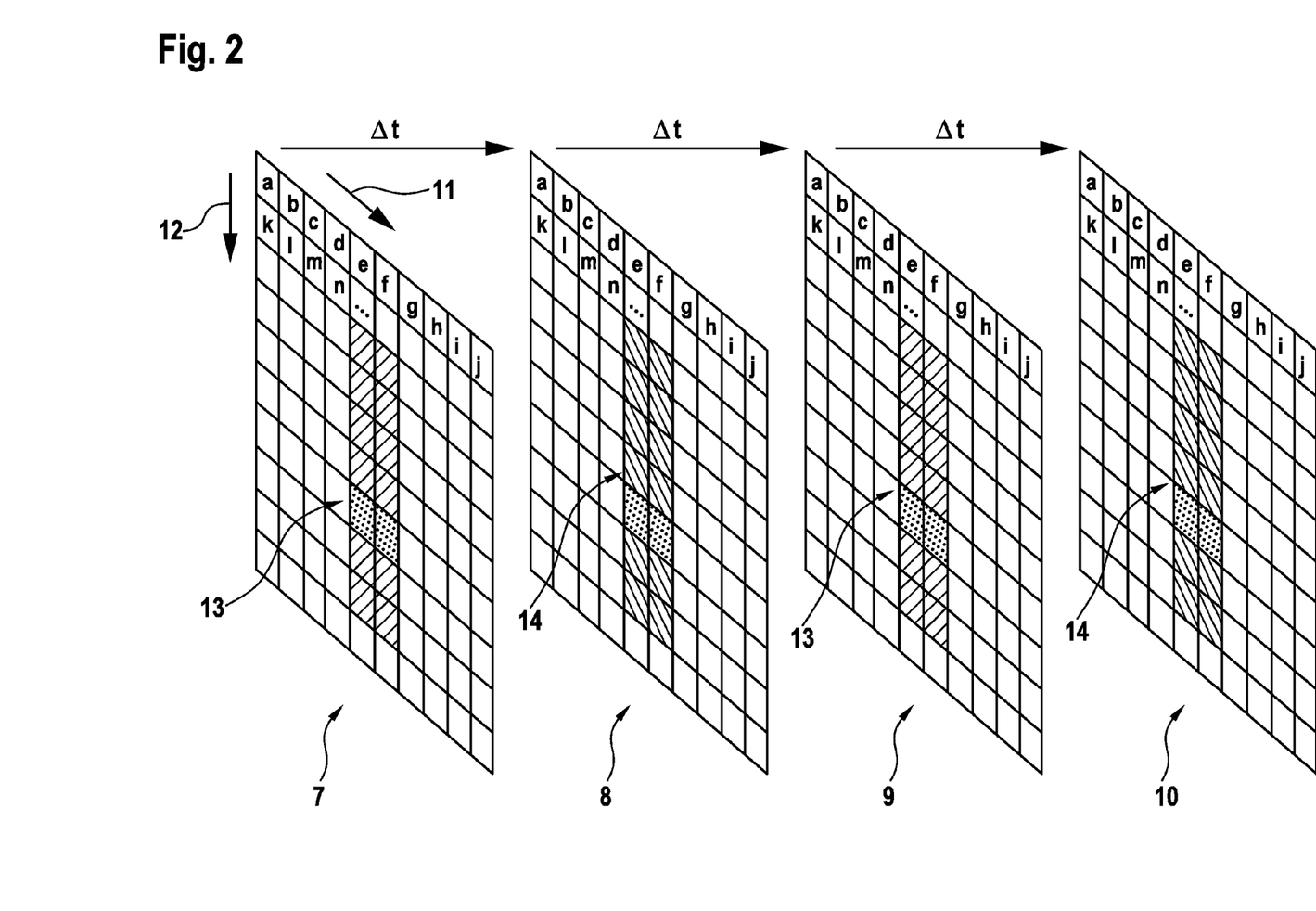
FIG. 2 is a schematic diagram of the image signal for a first embodiment of the invention.

The image signal transmitted by the transmitter 2 to the receiver 3 is composed of a timed sequence of images 7, 8, 9, 10, which are illustrated in FIG. 2 generically and purely by way of example. It is obvious that the image signal diagrammed here is given only for the sake of illustration and that basically it can comprise any number of images. Images 7-10 contained in the image signal are separated from each other by a time interval $\Delta t$ and comprise a plurality of pixels, only a few of which are identified here, for example, by the reference letters a-n in combination with their positions within the images 7-10. The pixels a-n are organized, for example, in columns (arrow 11) and rows (arrow 12).

Each pixel a-n has at least one pixel value, which describes how the image 7-10 in question will be reproduce on the display device 6. In the case of a gray-scale image, each pixel a-n usually comprises only a single pixel value, which can have any desired resolution. Standard resolutions are, for example, 8 bits, 10 bits, 12 bits, and 16 bits. In the case of a color image, each pixel a-n usually comprises several, in particular three, pixel values. Each pixel value can be assigned to a certain color or color intensity. It is standard practice to assign one pixel value for each of the colors red, green, and blue to each pixel.

Images 7-10 of the image signal are composed of the image content and a component signal. The image content corresponds essentially to the scene recorded by the recording device 5, that is, to the conversion of the scene into electronic form, especially under consideration of the color space. The component signal is a part of the alternating signal, which is superimposed on the image signal before transmission over the transmission route 4. The alternating signal changes at a signal alternation frequency, which means that the component signals assigned to the alternating signal alternate at this frequency. The superimposition of the alternating signal on the image content takes place in, for example, the transmitter 2 or perhaps even in the recording device 5, which therefore means that in any case it is done before the images are transmitted and preferably done as soon as the image content is recorded. In particular, the superimposition should be carried out before any image buffers of the image-processing device which may be provided. The recording device 5 has, for example, a CCD or CMOS sensor (not shown separately), which supplies a digital input signal to the transmitter 2 at a recording frequency (images per unit time).

What is meant by the "superimposition of the component signal of the alternating signal on the image content" is that the component signal has the effect of producing differences between the image content and the original scene recorded by the recording device 5. The component signal can at least partially replace one or more of the pixels a-n, or alternatively it can merely modify them. For example, the component signal can be organized into pixels or pixel values in the same way that images 7-10 or their image contents are organized. Either each component signal specifies absolute values by which the images 7-10 or their image contents are overwritten before transmission, or alternatively the component signal specifies merely relative values by which the images 7-10 are modified by addition, for example, of the relative values to the pixel values of the pixels of the image contents of the images 7-10.

As already mentioned, FIG. 2 shows images 7-10, which follow each other at a time interval of Δt. Images 7-10 are part of the image signal which is transmitted digitally from the transmitter 2 to the receiver 3. The time interval Δt thus corresponds to the inverse of the transmission frequency. When the image content, i.e., the images 7-10, recorded by the recording device 5 is transmitted digitally, it is advisable to indicate to the user of the display device 6 or of the image-processing device 1 whether the image transmission over the transmission route 4 is successful or faulty. The "successful" transmission of the images is understood to mean that, after the images 7-10 have been recorded by the recording device 5, they are displayed on the display device 6 after the slight delay caused by the processing and transmission operations, and that the timed sequence of the image contents of the images 7-10 remains preserved.

If an error occurs, however, such as an error in the transmission route 4 or perhaps an error during the recording by the recording device 5 itself or an error in the acquisition of the recorded input signal by the transmitter 2, changes can occur in the timed sequence of images 7-10, or at least some of images 7-10 are not displayed at all. In particular, it can occur in this case that one of the images 7-10 is repeated; that is, a frozen image is displayed. This happens in particular when the receiver 3 comprises the previously mentioned image buffer. Successfully transmitted images 7-10 are written to this buffer. If a defect occurs subsequently in the image transmission process, under certain conditions the image 7-10 most recently written to the buffer is repeated until it is possible for images to be transmitted successfully again. If provision is made to compare successive images 7-10 to each other to detect successful or faulty image transmission, this comparison is preferably not conducted immediately after the transmission or at the end the transmission route 4, but rather only after the images have left the image buffer of the receiver 3. If, in addition or alternatively, the image buffer is assigned to the display device 6, the comparison is preferably not carried out until the images have left the image buffer and arrived in the display device 6.

The determination and visual indication of whether the image transmission has been successful or faulty is meaningful especially for medical applications, in which, for example, the person performing a treatment performs that treatment on the basis of the images 7-10 displayed on the display device 6. If the images 7-10 being shown are not current because of, for example, faulty image transmission between the transmitter 2 and the receiver 3, the treating person cannot act correctly, which could have serious consequences for the patient or even for the person performing the treatment. For this reason, the alternating signal, which alternates at a signal alternation frequency, should be superimposed on the timed sequence of images 7-10 illustrated here, i.e., on their image contents, before they are transmitted, in particular therefore in the transmitter 2 or even before that. The signal alternation frequency should be greater than or equal to the perception frequency resolvable by the human eye, therefore in particular at least 20 Hz.

In the exemplary embodiment shown in FIG. 2, images 7-10 or their image contents have a resolution of 10 by 10 pixels, only some of which are identified by the reference letters a-n. This resolution, however, is given purely as an example; normally much high resolutions are used, especially in the medical area. The alternating signal consists in the present case of two component signals 13 and 14, which in the present case have a resolution of 2 (horizontal) by 7 (vertical) pixels. The resolution of the component signals 13 and 14 is also given purely as an example and can be either higher or lower. The component signals 13 and 14 of the alternating signal alternate with each other, so that component signal 13 is assigned to images 7 and 9, whereas component signal 14 is assigned to images 8 and 10.

Component signal 13 comprises pixels with positive pixel values (shaded) and neutral pixels (dotted). Component signal 14, in contrast, has only negative pixel values (opposite shading) and neutral pixels (dotted). The pixels of component signals 13 and 14 in the present case represent an exclamation point. Of course, any desired symbol could be used. The neutral pixel values are equal to zero, so that the pixel value of the image content is not changed when the two values are added. The alternating signal should be impressed onto the image signal or on images 7-10 in the form of a complementarity sign. When the alternating signal is superimposed on the image signal, therefore, the pixel values of alternating signal 13 are added to the pixel values of the image content for images 7 and 9. The result of the addition represents the pixel value of the corresponding image 7 or 9. As a result of the addition of the positive pixel value of component signal 13, the pixel value of the image content is increased. Correspondingly, it is decreased by the addition of the negative pixel value of component signal 14 to the image contents of images 8 and 10. Only in the area of the neutral pixel values of component signals 13 and 14 (dotted) does the pixel value of the image content of images 7-10 remain unchanged.

When the successive images 7-10 which contain the alternating signal are shown on the display device 6, component signals 13 and 14 average out because of the signal alternation frequency at which the component signals 13 and 14 periodically alternate, so the user of the image-processing device 1 can see little or no change in the image content as long as the image transmission, in particular the transmission over the transmission route 4, is successful. If, however, an error in the image transmission occurs in the transmission route 4, with the result that one of the images 7-10 freezes and thus is displayed by the display device 6 for a time longer than Δt, the user will be able to recognize one of the component signals 13, 14. He can then react promptly and appropriately to the error in the image transmission.

It is especially preferable to superimpose the alternating signal, that is, the component signals 13, 14, on the useful area of the images 7-10. In addition to the useful area, each of the images 7-10 can also comprise an outside area and an edge area. The useful area and the edge are shown on the display device 6, whereas the outside area is not. For example, the edge area comprises the outer pixels of images 7-10, whereas the useful area is enclosed by the edge area. The outside area, however, is not shown in FIG. 2. Normally, it completely surrounds the edge area. The outside area and the edge area can have any desired resolution, i.e., any desired number of pixels.

FIG. 3 shows a schematic diagram of the image signal consisting of the images 7-10 for a second embodiment of the invention. It is provided here that, when the alternating signal is superimposed on the image signal, the pixel values of images 7 and 9 are set to a certain first value in a modification area 15. For images 8 and 10, conversely, the pixel areas in the modification area 15 are set to a certain second value. The first value is, for example, a minimum value, and the second value is a maximum value, wherein the reverse order is also possible. The pixel values with the minimum value are displayed as black by the display device 6, and the pixel values with the maximum value are displayed as white. The embodiment presented here is preferably used for gray-scale images.

The modification area 15 is surrounded in each case by a background area 16, which comprises pixel values which, when displayed, correspond to the color impression which is caused by the alternating display of the pixels in the modification area 15. The background area 16 can also be part of the modification area 15. When the transmission or display of the images 7-10 is error-free, the pixel values in the modification areas 15 average out, so that the impression of a monochrome surface consisting of the modification area 15 and the background area 16 is created. If, however, an error occurs, that is, if one of the images 7-10 freezes, the user of the image-processing device 1 can clearly see the modification area 15 in the foreground; it therefore stands out clearly from the background area 16. This makes it easy for the user to tell whether the image transmission, i.e., the display of the images, is free of error or not.

Component signal 13 consists correspondingly of, first, the modification area 15 with the pixel values corresponding to the first value and, second, the background area 16, whereas component signal 14 consists of, first, the modification area 15 comprising the pixel values corresponding to the second value and, second, the background area 16. Optionally, the background area 16 can be omitted, so that the component signal 13 or 14 comprises only the modification area 15. In an embodiment of this type, the background area 16 can be displayed as part of the image content or be eliminated entirely. In FIG. 3 it is obvious that the component signals 13, 14 are intended to be located in the edge area of the images 7-10. For this reason, they are shown on a larger scale. The component signals 13, 14, i.e., their pixels, replace the pixels of images 7-10, so that it is usually not desirable to superimpose them on the image content in the useful areas of images 7-10.

In a third embodiment of the invention (not shown), it is provided that the alternating signal comprises the component signals 13 and 14, wherein the first component signal 13 comprises a first symbol and the component signal 14 comprises a second symbol, different from the first one, wherein the two symbols are superimposed on each other when displayed by the display device 6. For example, the first symbol is a vertical bar and the second symbol is a horizontal bar, wherein the two symbols are arranged with respect to each other in such a way that the bars intersect at their midpoints. When the images 7-10 are being transmitted and displayed correctly, the impression of a plus sign is thus created, whereas, when there is an error in the transmission or when one of the images 7-10 freezes, only a vertical or only a horizontal bar is displayed. This makes it easy for the user of the image-processing device 1 to tell whether the transmission and display of the images is error-free or not.

Basically it is provided that the superimposition of the alternating signal on the image signal should be carried out as early as possible in the transmission chain and that the evaluation should be carried out as late as possible. Accordingly, the superimposition is carried out preferably immediately after the recording or at least before the transmission or possibly before any buffering which may be provided. The evaluation with respect to successful or faulty image transmission, however, is carried out by the user after the images are displayed or alternatively in automatic fashion immediately prior to their display, but at least after their transmission.

In the embodiments of the invention described above, an evaluation can be carried out automatically, in particular by comparison of the (immediately) successive images, instead of by the user himself, who is merely shown the result of this evaluation. The user therefore does not have to recognize for himself whether the images have been transmitted correctly or not. Instead, the status of image transmission is determined automatically. If automatic evaluation is provided, the alternating signal can be selected in such a way that, when it is superimposed on the image signal, the user cannot or can barely recognize it even when the image transmission is faulty. For example, only the least significant bit of the pixels in the modification area 15 is changed, preferably to arrive at a certain parity of the associated pixel value. Especially in embodiments in which the user is unable in any case to perceive the change in the individual images 7-10 caused by the superimposition, it is also quite possible to select a signal alternation frequency which is lower than the perception frequency.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for operating an image-processing device, in which an image signal is digitally transmitted between a transmitter and at least one receiver, and the image signal comprises a timed sequence of images, wherein an image buffer is assigned to the receiver, into which successfully transmitted images are written, and the image most recently written to the buffer is repeated if a defect in the image transmission process occurs, wherein an alternating signal which alternates at a signal alternation frequency is superimposed on the image content of the images before they are transmitted and before the image buffer, and the signal alternation frequency is greater than or equal to the perception frequency resolvable by the human eye.

2. A method according to claim 1, wherein the images are displayed by a display device at a display frequency which is greater than or equal to the signal alternation frequency.

3. A method according to claim 1, wherein the superimposition is carried out in a recording device during or immediately after the recording of the image content and/or prior to their digital transmission.

4. A method according to claim 1, wherein each image and the associated image content comprises numerous pixels (a-n), each with a pixel value, and the alternating signal influences the pixels (a-n) in a modification area of the image.

5. A method according to claim 1, wherein the alternating signal comprises at least two different, alternating component signals; and each component signal includes at least one pixel; and the pixel value of the pixel is impressed on the corresponding pixel value of the image content by addition or overwriting.

6. A method according to claim 4, wherein when the alternating signal is superimposed on the image content, at least one bit of a pixel value, is set to a certain first value for the first of the successive images of the image signal and set to a certain second value for the second of the images.

7. A method according to claim 6, wherein all of the bits of the pixel value in question are set, the first value being a maximum value and the second value a minimum value of the pixel value.

8. A method according to claim 6, wherein the bit is the least significant bit of the pixel value in question.

9. A method according to claim 6, wherein the first and the second value are selected in such a way that, when the bit is set, a certain parity of the pixel value is obtained, in particular a parity which differs between the first and the second of the successive images.

10. A method according to claim 4, wherein when the alternating signal is superimposed on the image signal, at least one pixel value is increased by a certain value for the first of the successive images and decreased by the same value for the second of the images.

11. A method according to claim 10, wherein the certain value is decreased when the increase and/or decrease leads to an overrun of the pixel value or is increased to a certain maximum value when no overrun is present.

12. A method according to claim 1, wherein the images of the image signal follow each other at a frame-change frequency, and the frame-change frequency is greater than or equal to the signal alternation frequency.

13. A method according to claim 1, wherein each image comprises a useful area, which is seen when the image is displayed by the display device; an edge area, also seen, which lies outside the useful area; and an outside area, which is not seen; and wherein the modification area lies in the useful area, in the edge area, and/or in the outside area.

14. A method according to claim 1, wherein the alternating signal comprises a symbol, in particular a pictogram or a character.

15. An image-processing device, comprising:
a transmitter and at least one receiver, which are designed for the digital transmission of an image signal, which comprises a timed sequence of images, wherein an image buffer is assigned to the receiver, into which successfully transmitted images are written, and the image most recently written to the buffer is repeated if a defect in the image transmission process occurs, wherein the image-processing device is configured to superimpose an alternating signal, which alternates at a signal alternation frequency, on the image content of the images before the images are transmitted and before the image buffer, and wherein the signal alternation frequency is greater than or equal to the perception frequency resolvable by the human eye.

* * * * *